J. J. RALYA.

Plane-Irons.

No. 6,462. Reissued May 25, 1875.

WITNESSES:

Jas. E. Hutchinson

John R. Young

INVENTOR.

Jno. J. Ralya, by

Prindle and Co., his Attys

THE GRAPHIC CO. PHOTO-LITH. 39 & 41 PARK PLACE, N.Y.

UNITED STATES PATENT OFFICE.

JOHN J. RALYA, OF CLEVELAND, OHIO.

IMPROVEMENT IN PLANE-IRONS.

Specification forming part of Letters Patent No. 138,762, dated May 13, 1873; reissue No. 6,462, dated May 25, 1875; application filed February 17, 1875.

DIVISION B.

*To all whom it may concern:*

Be it known that I, JOHN J. RALYA, of the city of Cleveland, in the county of Cuyahoga, State of Ohio, have invented certain new and useful Improvements in Plane-Irons, for which Letters Patent No. 138,762 were issued to me upon the 13th day of May, 1873, and which Letters Patent have been found defective, in that the specification and claims do not cover and embrace all of the original invention as shown in the model and drawing filed in the Patent Office upon the 31st day of August, 1871, and the 29th of November, 1871, respectively. Now, therefore, being desirous of reissuing said Letters Patent herewith surrendered, I have prepared, and do hereby declare that the following is, a full, clear, and exact description of the said invention, reference being had to the accompanying drawings, making a part of this specification, in which—

Figure 1:
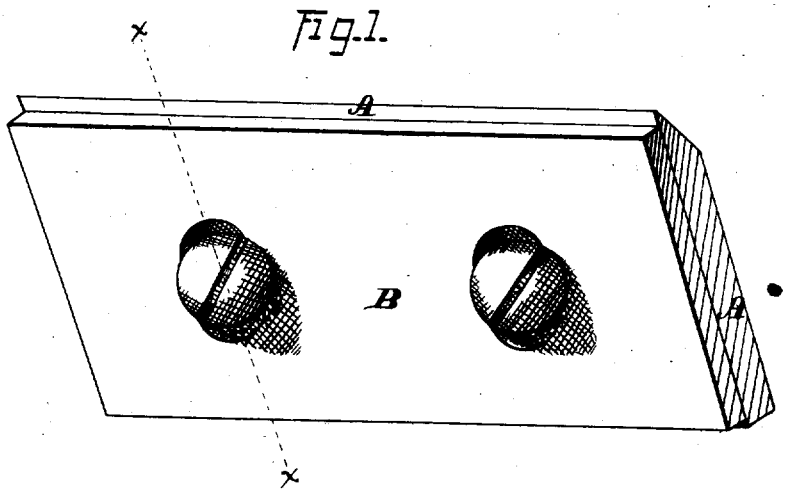
Figure 2:
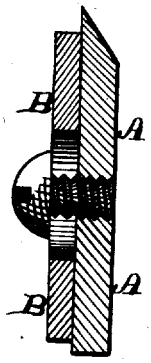

Figure 1 is a perspective view of the upper side of a plane-iron, having attached thereto one of my improved caps; and Fig. 2 is a longitudinal section of the same.

Letters of like name and kind refer to like parts in each of the figures.

The design of my invention is to enable wood to be smoothly dressed by machinery, regardless of the irregularity of its grain; and it consists in a plane-iron provided with a cap, which, at its front end, has an angle of ninety degrees with relation to the forward or outer face of the iron, substantially as and for the purpose hereinafter specified.

In the annexed drawing, A represents a plane-iron of ordinary construction, to or upon the front side of which is secured a cap, B, that is capable of longitudinal adjustment, so as to bring its forward end nearer to or remove the same farther from the corresponding end of said iron. The forward end of the cap B is made square or at a right angle to the face of the iron A, so that shavings striking against said end will be broken in pieces or crumbled more effectually than would be the case were the end of said cap made sloping. The result of thus breaking in pieces the shavings is the prevention of gouging whenever the tool cuts over cross-grained or knotty wood, said tool being enabled to cut as smoothly over such wood as over that which is straight-grained and free from knots.

Having thus fully set forth the nature and merits of my invention, what I claim as new, is—

In combination with a cutting-blade or plane-iron, a cap, which, at its forward end, has an angle of ninety degrees with relation to the outer face of said blade, substantially as and for the purpose specified.

In testimony whereof I hereunto set my hand this 7th day of April, 1875.

JOHN J. RALYA.

Witnesses:
H. E. PRINDLE,
JOHN HIRSIUS.